2 Sheets—Sheet 1.
C. F. JOHNSON, Jr.
Grass Seeder.
No. 229,826. Patented July 13, 1880.
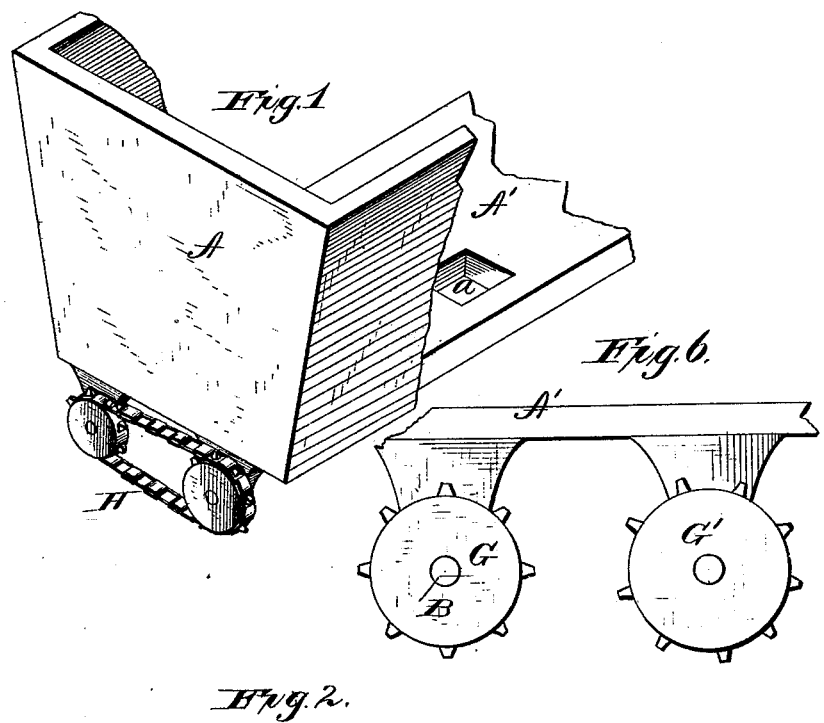
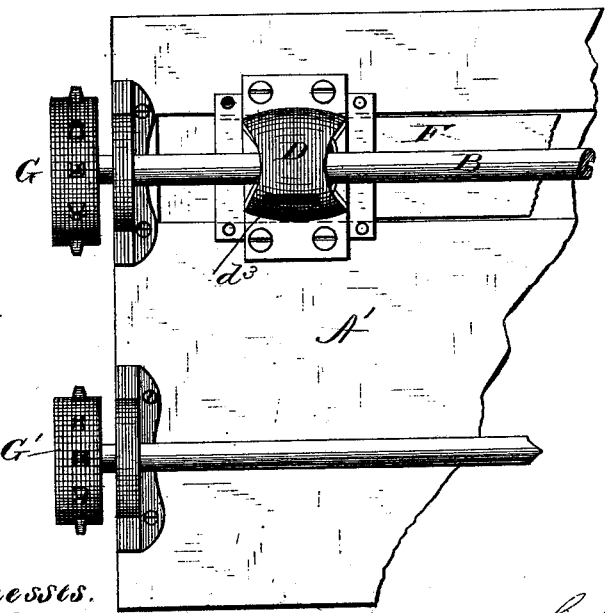
Witnesses:
N. L. Ouraud
Alex Mahon
Inventor:
Chas. F. Johnson Jr.
by A. M. Smith
Attorney.

2 Sheets—Sheet 2.

C. F. JOHNSON, Jr.
Grass Seeder.

No. 229,826. Patented July 13, 1880.

Witnesses.
F. L. Ouraud
Alex Mahon

Inventor
Chas. F. Johnson Jr.
by A. M. Smith
Attorney.

N. PETERS, PHOTO-LITHOGRAPHER, WASHINGTON, D.C.

UNITED STATES PATENT OFFICE.

CHARLES F. JOHNSON, JR., OF OWEGO, NEW YORK.

GRASS-SEEDER.

SPECIFICATION forming part of Letters Patent No. 229,826, dated July 13, 1880.

Application filed December 18, 1879.

*To all whom it may concern:*

Be it known that I, CHARLES F. JOHNSON, Jr., of Owego, county of Tioga, State of New York, have invented certain new and useful Improvements in Grass-Seeders, of which the following is a full, clear, and exact description, reference being had to the accompanying drawings, making part of this specification, in which—

Figure 3:
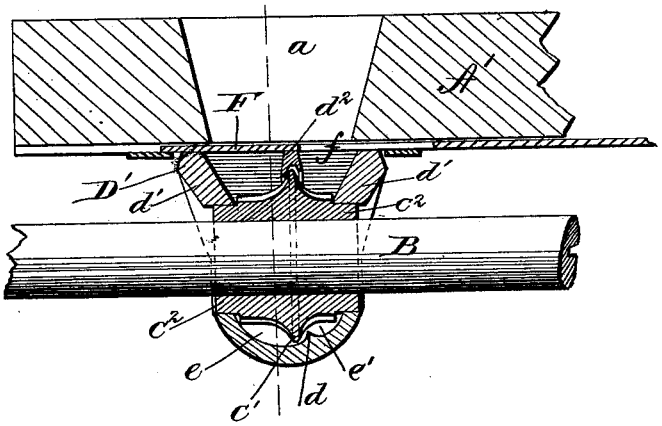
Figure 5:
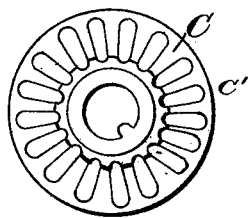
Figure 4:
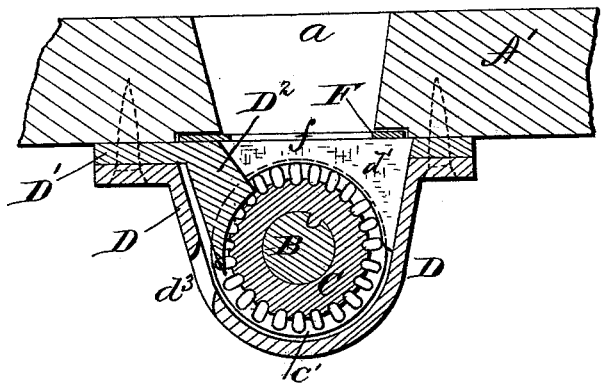

Figure 1 is a perspective view of a seed box or hopper. Fig. 2 is a bottom view of the same enlarged. Fig. 3 represents, in transverse section, a portion of the hopper-bottom with one of my improved double distributers attached. Fig. 4 represents the same in longitudinal section. Fig. 5 is a side elevation of one of the distributing-wheels, and Fig. 6 shows the driving sprocket-wheels in side elevation.

Similar letters of reference denote corresponding parts wherever used.

The object of my invention is to furnish a distributer for the grass-seed attachment to grain-drills adapted to distribute timothy, clover, and other minute seeds in small quantities with accuracy, which at the same time can be cheaply made and is capable of accurate adjustment for varying the quantity of seed distributed, and which is also readily adjustable in position on the machine. Heretofore, so far as I am aware, these small seeds have been distributed from a box having a series of small holes in its bottom, having a perforated slide or equivalent means for varying the size of the holes, and a device for agitating the seed and preventing its clogging; or, where distributing-wheels are used, variation in the quantity of seed distributed is effected by varying the size of the seed-discharging channel by means of slides or equivalent devices for that purpose.

The objection to the first-named method is, that the holes being necessarily very small, it is difficult to gage them with precision, and they are liable to become choked with foul stuff—straw, chaff, &c.

Another objection is, that fine seed will continue to escape when the machine is stopped, and as the quantity sown depends on time and not on the speed of the machine, when drawn by a fast team the machine will sow less per acre than when drawn by a slow one.

The second method named avoids most of the difficulties recited, but is difficult to adjust with precision for varying the distribution of the seed, and requires accurate fitting of the parts, rendering lathe-work necessary, thereby making the machines expensive to manufacture.

My invention is designed to overcome these difficulties; and it consists in the employment of double distributing-wheels in combination with casings having independent distributing-channels of different sizes or capacities, and a perforated slide or false bottom to the seed-box, by means of which either or both parts of the double wheels may be brought into action for discharging the seed, as hereinafter described.

It further consists in the combination, with the double wheels having casings provided with independent and different-sized discharging-channels, as described, of means for varying the speed of said wheels, and thereby increasing the number of variations in the feed or distribution of the seed, as hereinafter explained.

In the accompanying drawings, A represents the seed box or hopper, which may be of the form usually attached to the grain box or hopper of the grain-drill, or an independent box of any suitable form and construction, as required, the bottom A' being provided with a series of perforations, $a$, for the passage of the seed.

B is a distributer-wheel shaft mounted in suitable bearings underneath the hopper in the same vertical transverse plane with the series of openings $a$. This shaft may be either square, polygonal, or round, and provided with a longitudinal groove, as shown, to match the eye or perforation through the feed-wheels mounted thereon, adapting it to rotate said wheels.

C represents one of the series of double distributing-wheels employed, said wheel being made by preference in form approximating two frustums of cones uniting in a central rib or flange, $c'$, at their bases. One of these frustums is made shorter than the other, and each terminates in a sleeve, $c^2$, at its outer end, forming journals which have bearings in the casing plate or shell. The periphery of the wheel between the central rib and the sleeves or journals has a series of grooves in it, forming starts for feeding the seed forward. The casing plate or shell is made in two parts, D D', dividing the bearings for the sleeves c, and permitting the introduction and removal of the wheels, the main part D being made in the form of a pendent loop, (see Fig. 4,) concave on its inner face, adjacent to the wheel, as shown in Fig. 3, and is provided with a rib, d, which rises upon one side of and in close proximity with the rib c' on the wheel C. The other part, D', has pendent ears d' at the sides of the wheel, in which the upper half-bearings for the wheel-sleeves are formed, and a central grooved rib, $d^2$, forming a bridge over the wheel, the rib c' on the wheel moving in the groove in said bridge $d^2$, the rib c' and the ribs d and $d^2$ separating the two parts of the wheel C.

The ears d' have a web, $D^2$, extending across the wheel upon its rear face, the lower edge of said web conforming to the outline of the face of the wheel, and terminating, at or near the discharge-outlet $d^3$, in the casing D, said web forming a clearing device for the wheel and serving to force the grain outward through said discharge-opening.

By the construction and arrangement described it will be seen that by means of the double wheel and the casing constructed as described two distinct channels are formed for each distributing-wheel, one wider and larger than the other, as shown at e e', Fig. 3, both receiving seed from the same opening in the hopper bottom, and both terminating in a common discharge-outlet, $d^3$. The casing-plates have flanges formed upon them, through which, by means of through bolts or screws, they are secured to the hopper-bottom.

The bottom of the hopper is grooved longitudinally to receive a perforated slide, F, or false bottom, arranged over the distributer-wheels, and extending lengthwise of the hopper, as shown.

The perforations f in the slide correspond in size and arrangement to those in the hopper-bottom, and by endwise movement of the slide the operator can open the channel e' only, as shown in Fig. 3, or the channel e only; or, by bringing the openings in the slide so that they coincide with those in the hopper-bottom, both channels will be thrown open and both sides of the double wheel will be brought into action, thus giving three different quantities of feed, each unvarying and exact in itself, and without precision in the construction and fitting of the parts by which this result is accomplished.

Three additional changes of feed are effected, as follows: The distributer-wheel is provided with a sprocket-wheel, G, to which motion is imparted, through an endless chain, H, from a sprocket-wheel, G', which may be on the axle or upon any suitable shaft gearing therewith.

The wheels G G' are connected with their respective shafts in any convenient way adapting them to be readily removed and transposed. One of them is provided, say, with eight teeth or sprockets, and the other with nine, as shown in Fig. 6 by way of illustration. Now, supposing the larger one, G', as in Fig. 2, to be upon the distributer-shaft B, and to be driven by the smaller one, G, a slow movement of the shaft B is produced, and with said movement three different rates of feed can be had through the adjustment of the slide F, as explained. Now, if a slight increase in either of said feeds is desired, it may be obtained by transposing the wheels G G', in which case the larger wheel will drive the smaller, giving a more rapid rotation to the distributer-shaft. Thus six changes of feed can be obtained by the construction shown and described, each certain and unvarying in itself, and all without the aid of highly-finished and closely-fitted adjusting parts or gages, and without the addition of extra parts, though extra gears or sprocket-wheels may be used for increasing the number of changes, if desired.

Having now described my invention, I claim—

1. A series of double distributing-wheels the inclosing shells or casings of which are provided with independent discharging-channels of different sizes, in combination with the single perforated slide, whereby either one or both series of discharging-channels can be brought into action for discharging the seed, substantially as and for the purpose described.

2. The double distributers having independent discharging-channels of different capacities, either or both of which may be brought into action, as described, in combination with the driving-chain and interchangeable sprocket-wheels of different diameters on the driving and distributer wheel shafts, for changing or regulating the quantity of seed discharged, substantially as described.

3. The double distributer composed of the casing-plates D D' and the double wheel C, the former having rib d' fitting against the side of the dividing-rib on the wheel, substantially as described.

CHARLES F. JOHNSON, JR.

Witnesses:
W. M. CHAUVENET,
CHAS. E. SMITH.